United States Patent [19]

Lagerquist et al.

[11] 4,287,938

[45] Sep. 8, 1981

[54] METHOD FOR EXCHANGING HEAT AND A DEVICE FOR CARRYING OUT SAID METHOD

[76] Inventors: Sven G. R. Lagerquist, Göingevägen 1; Yngve R. Kihlberg, Ingelstadsvägen 47, both of 230 47 Åkarp, Sweden

[21] Appl. No.: 73,427

[22] Filed: Sep. 7, 1979

[30] Foreign Application Priority Data

Sep. 14, 1978 [SE] Sweden ............................. 7809801

[51] Int. Cl.³ .................... F24F 3/14; F28D 15/00; F02M 23/14
[52] U.S. Cl. ...................................... 165/3; 55/222; 165/95; 165/104.25; 261/151; 261/153; 261/DIG. 9
[58] Field of Search .................... 126/117; 431/4; 261/DIG. 9, 151, 153; 60/DIG. 11; 165/1, 2, 3, 95, 105, 107, 106; 55/222, 229, 257 HE

[56] References Cited

U.S. PATENT DOCUMENTS

| | | | |
|---|---|---|---|
| 2,321,933 | 6/1943 | Osttad et al. | 261/151 |
| 2,570,247 | 10/1951 | Kals | 261/151 |
| 3,169,575 | 2/1965 | Engalitcheff et al. | 261/151 |
| 3,522,000 | 7/1970 | Kinney | 261/DIG. 9 |
| 3,748,080 | 7/1973 | Dunn | 431/4 |
| 3,797,204 | 3/1974 | Cavatassi | 261/DIG. 9 |
| 3,799,249 | 3/1974 | Linhardt | 261/153 |
| 3,833,205 | 9/1974 | McAnespie | 261/153 |
| 3,839,849 | 10/1974 | Maniya | 55/222 |
| 3,854,909 | 12/1974 | Hoisington et al. | 261/151 |
| 3,860,384 | 1/1975 | Vulliet et al. | 431/4 |
| 3,880,597 | 4/1975 | Goldschmidt et al. | 261/DIG. 9 |
| 3,888,642 | 6/1975 | Toyama | 261/DIG. 9 |
| 3,927,153 | 12/1975 | Tarhan | 261/DIG. 9 |
| 4,017,277 | 4/1977 | Van Dyke et al. | 261/DIG. 9 |
| 4,065,527 | 12/1977 | Graber | 55/222 |
| 4,121,541 | 10/1978 | Kneissl et al. | 261/151 |

FOREIGN PATENT DOCUMENTS

| | | | |
|---|---|---|---|
| 2131796 | 12/1972 | Fed. Rep. of Germany | 261/DIG. 9 |
| 2553415 | 2/1975 | Fed. Rep. of Germany | 261/DIG. 9 |
| 2504839 | 8/1976 | Fed. Rep. of Germany | 261/DIG. 9 |

*Primary Examiner*—Daniel J. O'Connor
*Attorney, Agent, or Firm*—Laurence R. Brown

[57] ABSTRACT

An improved method of exchanging heat between combustion gases from combustion of fossil fuel with air and a fluid to be heated is obtained by initially introducing into the exhaust gases a volatile medium to be vaporized by said gases and subsequently condensing the vaporized medium by cooling the obtained mixture of combustion gases and vaporized medium to a temperature below the dew point. The cooling is performed by the fluid to be heated. The new method reduces the contents of polluting ingredients in the exhaust combustion gases and will keep the heat exchange structures clean.

1 Claim, 1 Drawing Figure

U.S. Patent　　　Sep. 8, 1981　　　4,287,938
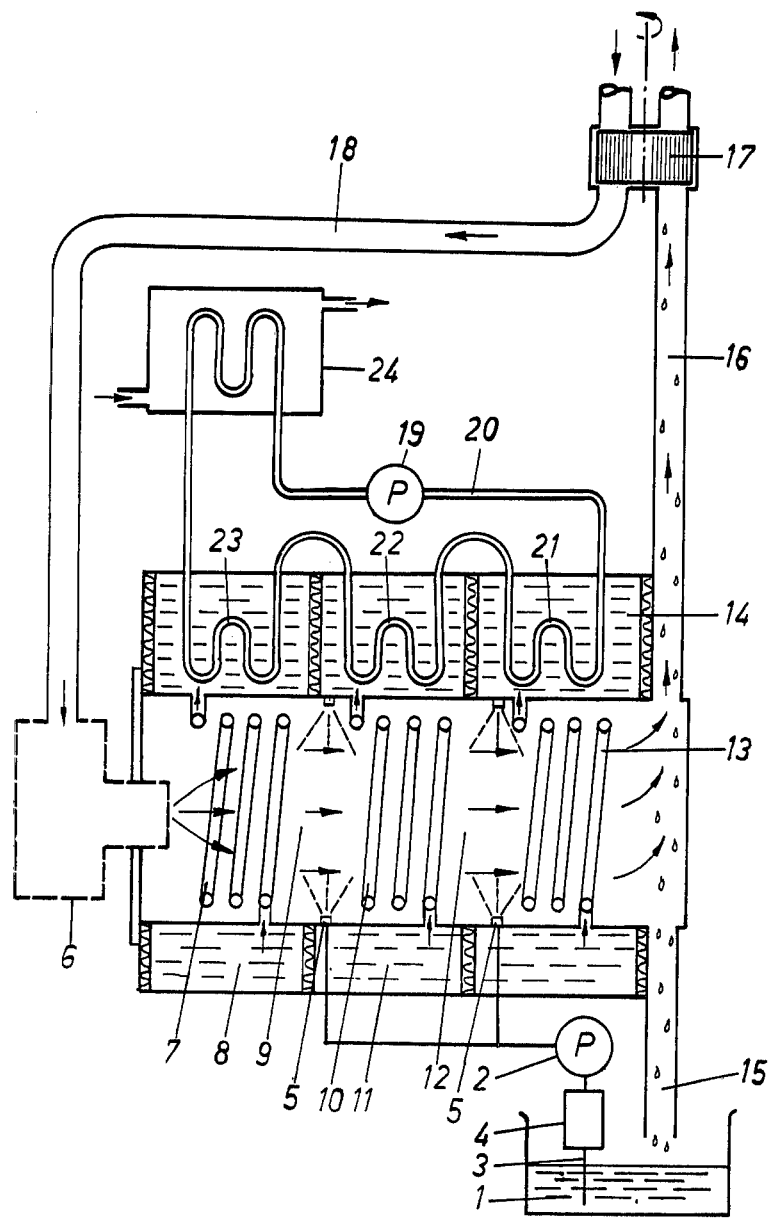

METHOD FOR EXCHANGING HEAT AND A DEVICE FOR CARRYING OUT SAID METHOD

This invention relates to a method of exchanging heat between a first flow of combustion gases from combustion of fossil fuel with air and a second flow of a heat absorbing medium through a wall separating said first and second flows and according to which a volatile medium in liquid phase having a high coefficient of evaporation and a low boiling point—e.g. water—is added to said first flow in a high temperature part thereof.

The known methods of the type referred to above will most often cause a low degree of efficiency due to formation of soot or other deposits on the heat exchanger walls. Alternatively the size of the heat exchanger must be overdimensioned. Many fossil fuels will not allow a cooling of the combustion gases to temperatures below the dew point (less than 200 degrees centigrade) because a formation of sulphuric acid will corrode the heat exchanger structure or the stack. Formation of soot or deposits may amplify the tendency for corrosion as they may retain the sulphuric acid. Normally the maximum degree of efficiency will be lower than 90 percent even when the heat exchanger is adequately designed and maintained. However, the average degree of efficiency during intervals between services is generally much lower. The method according to the present invention makes it possible to design a heat exchanger which is simple and has a rather small heat exchanging area and may therefore be cheap in manufacture even if made of corrosion resistant material. Soot formations are generally avoided, but the design will allow an easy cleaning, if required.

The method according to the invention is characterized in that the vapours of said volatile medium are caused to condense in a low temperature part of said first flow. Hereby it is obtained that a substantial heat transfer is performed according to the heat-pipe principle—i.e. a volatile medium is vaporized at one location and condensed at another location. Whereas said volatile medium in an ordinary heat pipe is performing a closed cycle within a hermetically closed system, the vaporizing and the condensing is performed at atmospheric pressure and in an open cycle according to the inventive method.

The condensing involves a very efficient heat transfer at low temperatures.

The invention also relates to a device for carrying out the claimed method and such device is shown schematically in the accompanying drawing and is described in detail below.

The reference numeral 1 designates a reservoir containing water. A pump 2 is adapted to suck water from said reservoir 1 via a conduit 3 containing a filter 4. The water is delivered to a number of spray nozzles 5 distributing the water into a flow of combustion gases delivered by an oil burner 6 of conventional design. The combustion gases are initially of high temperature and are cooled off by passing tubes 7 containing liquid from a reservoir 8 having ring shaped cross section and guiding the flow of combustion gases. The initial cooling of the combustion gases is effected by radiation and convection, and the combustion gases are subsequently passed through a zone 9 in which they are cooled by spraying water from the nozzles 5. The water is almost instantly vaporized and the mixture of vapour and combustion gases is cooled off by passing a further bundle of tubes 10 containing liquid from a further reservoir 11 of basically the same design as the reservoir 8. The mixture of vapour and combustion gases is subsequently cooled off in a zone 12 by a further water spray from the nozzles 5, and the combustion gas flow which now contains a large amount of water vapour is then cooled off by passing a third bundle of tubes 13 containing liquid from a third reservoir 14 of the same type and design as the reservoirs 8 and 11. The condensed vapour will be removed as water and returned to the reservoir 1 via a conduit 15. The exhaust gases are finally passed to a stack 16 in which a revolving disc 17 of porous material protrudes. The disc 17 also protrudes into a duct 18 for delivering air to the combustion in the burner 6. The latent heat in the combustion gases passing the stack 16 is thus recovered in a manner known per se.

The heat absorbed by the tubes 7, 10 and 13 and by the walls of the reservoirs 8, 11 and 14 is passed from the liquid in the reservoirs to a further circuit consisting of a pump 19 and tubes 20–23 and a radiator 24 connected in series. The said further circuit contains a fluid which is passed in the direction from the tubes 21 in the reservoir 14 to the tubes 22 in the reservoir 11 and further to the tubes 23 in the reservoir 8. Thus a high temperature of the fluid may be obtained at the entrance of the radiator 24 while a low temperature may be maintained in the reservoir 14.

The temperature in the reservoir 8 may be slightly above 100 degrees centigrade, while the temperature in the reservoir 14 may be as low as 30 degrees centigrade. The temperature in the reservoir 11 may be around 60 degrees centigrade. The temperature of the exhaust gases in the stack 16 prior to the passing of the disc 17 may be as low as 60 degrees centigrade, and thus the greater part of their contents of vapour will condense and be returned to the reservoir 1.

The regenerative heat exchanger formed by the revolving disc 17 also removes water from the exhaust gases and delivers said water to the flow of combustion air.

The device shown comprises three reservoirs 8, 11 and 14 having decreasing temperature levels. It is of course possible to use only one reservoir having a low temperature level, but this would make it necessary to keep the further circuit including the radiator 24 at a much lower temperature level, and thus call for very large dimensions.

One of the great advantages of the method according to the invention is that the stack of the device used may be made of materials which are not heat resistant e.g. plastic materials.

The water circulated in the heat exchange process will gradually increase its contents of sulphuric acid and should be neutralized by adding an alkaline substance—e.g. sodium carbonate—to the reservoir 1.

We claim:
1. A method of exchanging heat comprising the steps of establishing a heat source comprising a first flow of combustion gases from combustion of fossil fuel with air from a burner at a temperature high enough to vaporize water, establishing heat utilization means comprising a second flow through piping of a heat absorbing medium through the combustion gases, passing the combustion gases of said first flow through a chamber from a higher temperature to a lower temperature part, spraying into said chamber in said first flow at a position on the lower temperature side of said flow from said piping a volatile medium in liquid phase having a high coefficient of evaporation and a low boiling point—e.g. water—at least at said higher temperature part of the first flow path so that the medium is caused to vaporize and the vapours of said volatile medium flow toward said lower temperature part of the first flow path with the combustion gases and are thereat caused to condense in said lower temperature part, whereby the heat exchange between said first and second flow is made more efficient and requires less maintenance by removing with the medium soot and other materials tending to form deposits on said piping, characterized in that the combustion gases cooled in the low temperature part carrying moisture from said evaporation are used for regenerative preheating and humidifying of the air introduced to said burner for combustion, wherein said first flow is divided into a plurality of zones where the first flow has different temperatures, and wherein each zone is provided with separate piping of heat absorbing medium at different temperatures, said method further including the step of surrounding the first flow path of combustion gases with a ring shaped reservoir containing a cooling liquid.

* * * * *